United States Patent [19]

Maughan

[11] Patent Number: 5,607,249

[45] Date of Patent: Mar. 4, 1997

[54] NON-OSCILLATING SOCKET JOINT

[75] Inventor: Garth Maughan, Delta, Ohio

[73] Assignee: Dana Corporation, Toledo, Ohio

[21] Appl. No.: 277,711

[22] Filed: Jul. 20, 1994

[51] Int. Cl.⁶ .............................. F16C 11/04; B62D 7/16
[52] U.S. Cl. ..................... 403/165; 403/147; 403/143; 403/144; 403/120
[58] Field of Search ............................... 280/674, 716; 180/79; 403/164, 165, 132, 147, 143, 144, 120, 119

[56] References Cited

U.S. PATENT DOCUMENTS

| | | | |
|---|---|---|---|
| 1,985,781 | 12/1934 | Hufferd et al. | 287/85 |
| 2,569,823 | 10/1951 | Moskovitz | 280/674 X |
| 2,846,251 | 8/1958 | Herbenar . | |
| 2,944,829 | 7/1960 | Herbenar . | |
| 3,112,123 | 11/1963 | True . | |
| 3,210,108 | 10/1965 | Herbenar . | |
| 3,352,583 | 11/1967 | Patton . | |
| 3,361,459 | 1/1968 | Marquis . | |
| 3,434,763 | 3/1969 | Gerner . | |
| 3,945,737 | 3/1976 | Herbenar | 403/132 X |
| 4,101,227 | 7/1978 | Herbenar et al. | 403/147 X |

FOREIGN PATENT DOCUMENTS

| | | | |
|---|---|---|---|
| 661986 | 7/1938 | Germany | 403/132 |
| 1156323 | 10/1963 | Germany . | |
| 75132 | 5/1949 | Norway | 403/144 |

*Primary Examiner*—Anthony Knight
*Attorney, Agent, or Firm*—Rader, Fishman and Grauer PLLC

[57] ABSTRACT

A non-oscillating joint comprises a housing with an annular inner surface, an annular sleeve wedged within the housing, a stud with a radially outer bearing surface received in said housing, a radially outer bearing surface of the stud adjacent a radially inner surface of the sleeve, and an annular bearing wedged within the sleeve, the bearing having a longitudinally inner bearing surface contacting a longitudinally outer bearing surface of the stud. In a first embodiment of the present invention, both the radially outer bearing surface of the stud and the radially inner surface of the sleeve are generally conical, the stud wedged within the sleeve. In a second embodiment, a second bearing is wedged between the sleeve and the stud. The joint is subjected to additional compression pre-load when the housing is closed.

23 Claims, 2 Drawing Sheets

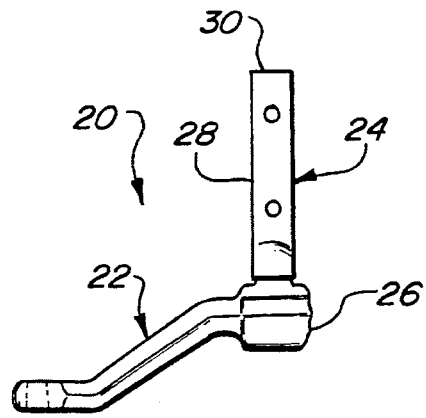
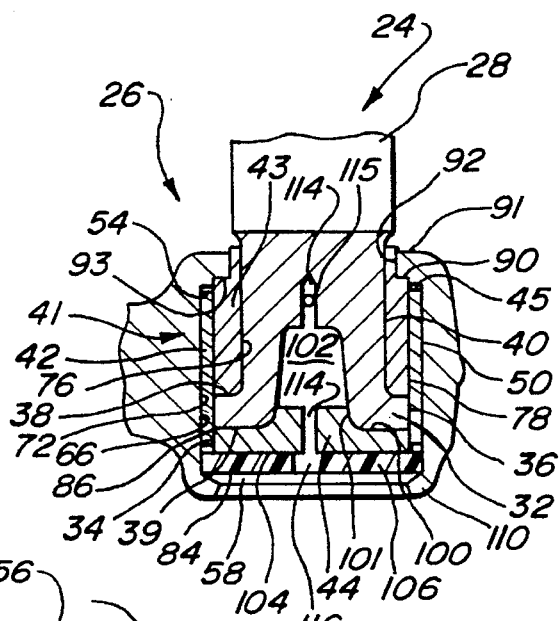
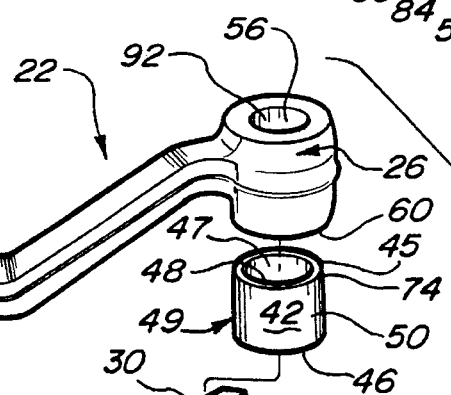
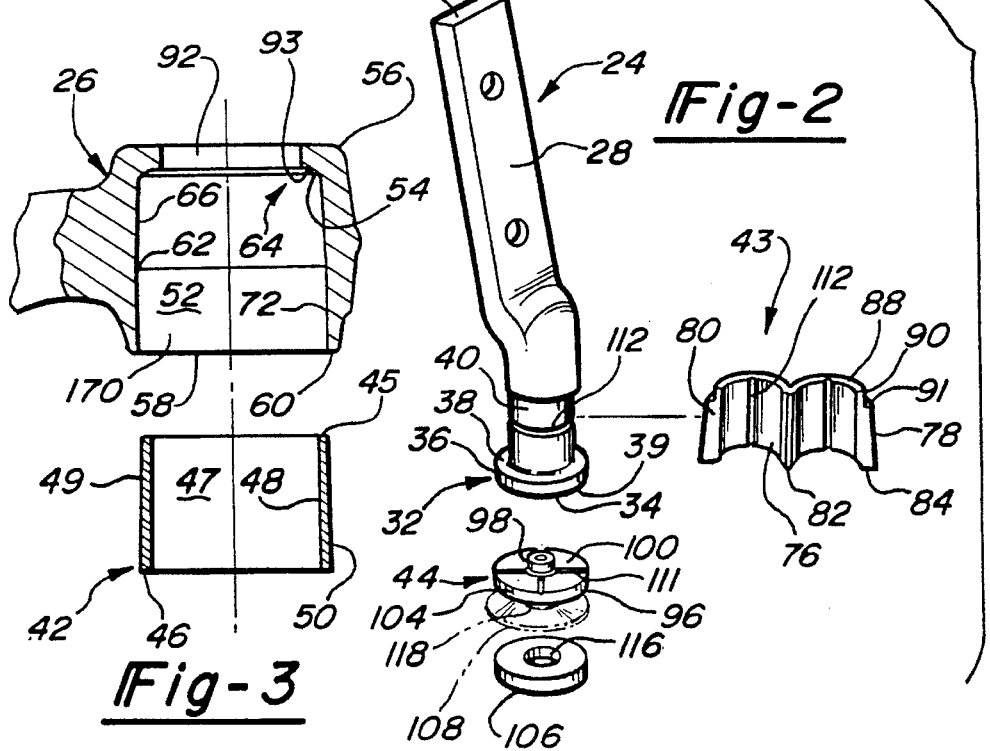

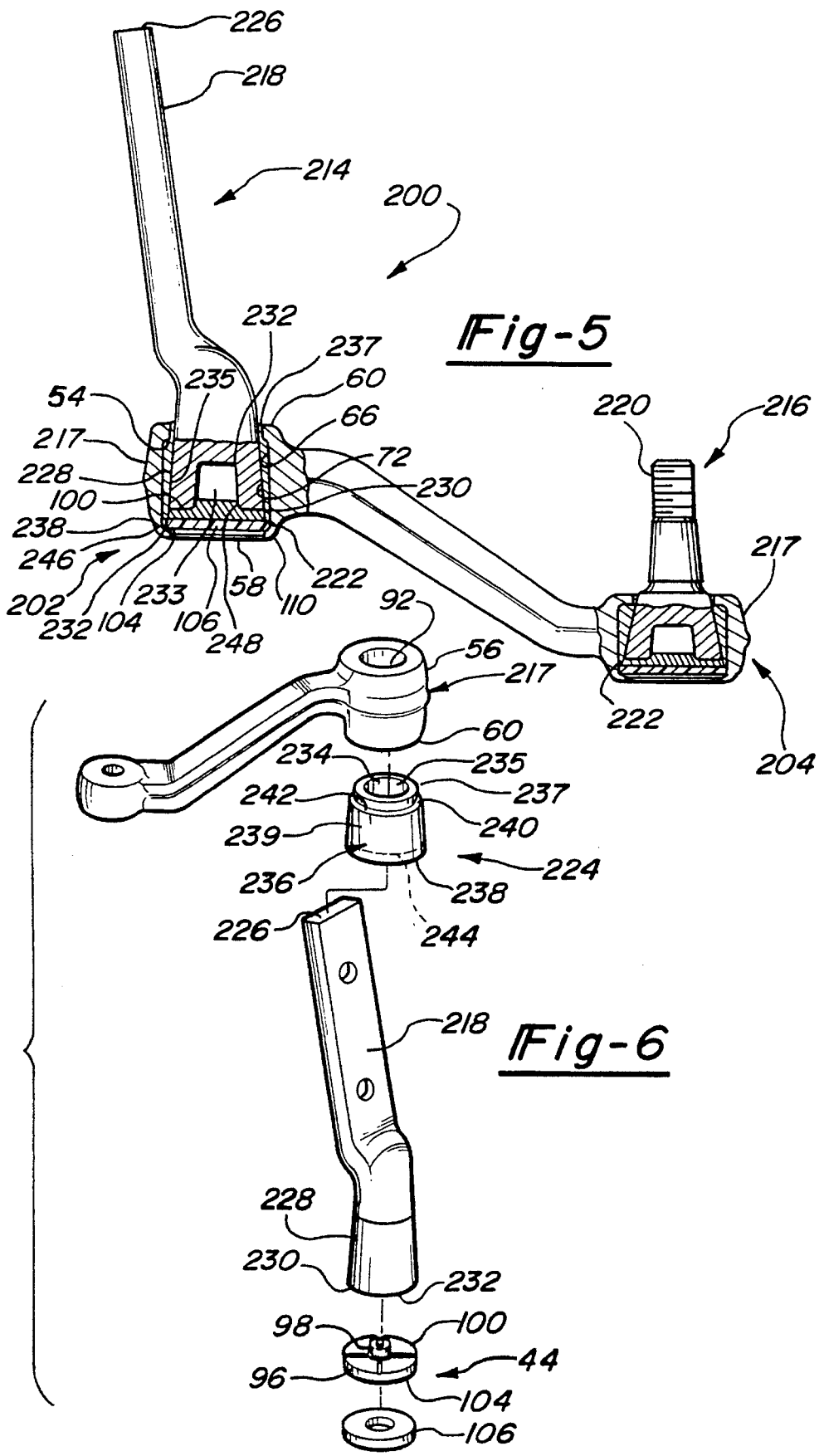

NON-OSCILLATING SOCKET JOINT

FIELD OF THE INVENTION

The present invention relates to non-oscillating socket joints with limited longitudinal or radial end play.

BACKGROUND OF THE INVENTION

Non-oscillating joints are applicable to a wide range of applications, including pitman-idler arms of steering linkages for automotive applications. Such joints typically include a cylindrical housing member adapted to receive a bearing together with a portion of a stud. The bearing reduces the amount of friction between the housing and the stud while frequently adapting for wear induced looseness between the stud and housing members.

Such joints have several disadvantages. Typically, the stud head must be forced into the bearing, and/or in turn the bearing forced into the socket. Extremely tight tolerances are required. Even with such tolerances, some bearings may crack during assembly, particularly when very rigid, stiff, inelastic materials are used. To reduce cracking, heavier material is often used together with slots within the bearing itself. Load distribution in such slotted bearings typically results in undesirable wear between the various components. Further, the bearings of such joints are adapted for only limited wear, resulting in joint failure as stud head rotating torque decreases and axial end play increases.

SUMMARY OF THE INVENTION

An improved non-oscillating joint includes a semi-rigid two piece or three piece bearing set that promotes easy joint assembly, results in a joint that is extremely tight with no longitudinal or radial play, but allows necessary stud rotation about a longitudinal axis, and compensates for wear using a self-adjusting feature related to the release of a compression pre-load within the bearing set. The joint is applicable to a wide range of applications, including pitman-idler arms of steering linkages for automotive applications.

The present invention relates to a housing with an annular inner surface defining a cavity, a ceiling or floor at one longitudinal end with an aperture centered in the floor, and an opening at a second longitudinal end of the housing. A bearing set is used to retain a bracket style cylindrically shaped rigid metallic stud within the housing with a portion of the stud extending through the housing aperture.

The bearing set includes an annular sleeve disposed within the housing, the sleeve having at least one cavity defined by a skirt, the sleeve including a radially inner surface, and a radially outer surface adapted to conform to the inner surface of the housing. A diameter of the radially outer surface of the sleeve is slightly greater than a diameter of the housing cavity to create an interference fit or wedging action between the sleeve and the housing that results in a radial compressive pre-load. Such a wedging action allows for a greater range of tolerances among the components.

The bearing set also includes an annular rim wedging bearing disposed within the sleeve by means of an interference fit between the sleeve and bearing. The bearing has a longitudinally inner bearing surface that contacts a longitudinally outer bearing surface of the stud, the stud also including a radially outer surface that is adjacent the radially inner surface of the sleeve. The bearing has a centering nib that is adapted to be received in a longitudinally extending opening on the longitudinally outer bearing surface of the stud. A sealing washer is disposed between the rim wedging bearing and the opening of the housing to act as a seal. Optionally, a bellville washer or wavy spring may be placed between the rim wedging bearing and the sealing washer to increase rotating torque.

Once the bearing set is installed within the housing, the housing is closed, applying a longitudinally compressive force on the sealing washer that is transmitted through the rigid stud and semi-rigid bearing set to the housing floor. The longitudinal loading provides additional compression pre-load to the bearing set.

In a first embodiment of the present invention, the radially inner surface of the sleeve and the radially outer surface of the stud within the housing are generally conical, the radially outer surface of the stud wedged within the sleeve by means of an interference fit. In a second embodiment, the bearing set includes a wedge bearing received between the sleeve and the stud. An interference fit is created between the wedge bearing and sleeve as well as between the stud and wedge bearing.

The radial and longitudinal compression pre-loading of the bearing set provides a unique self-adjusting feature to the present invention. As wear takes place, some compression pre-loading of the bearing set is released, while still maintaining zero axial or radial play of the assembled components. Thus, the joint can resist high radial and longitudinal load forces over an extend life, using elements that are less sensitive to tolerance variations, and produced at lower cost and with lower weight than known prior art joints.

BRIEF DESCRIPTION OF THE DRAWINGS

The features and inventive aspects of the present invention will become more apparent upon reading the following detailed description, claims, and drawings, of which the following is a brief description:

FIG. 1 is a side view of a first embodiment of a non-oscillating joint according to the present invention.

FIG. 2 is an exploded perspective view of the first embodiment of the present invention.

FIG. 3 is an enlarged and exploded partial cross-sectional view of a portion of the first embodiment.

FIG. 4 is a cross-sectional view of the assembled joint of the first embodiment.

FIG. 5 is a partial cross-sectional view of a second embodiment of the present invention.

FIG. 6 is an exploded perspective view of the second embodiment of the present invention.

DETAILED DESCRIPTION OF A PREFERRED EMBODIMENT

A first embodiment of the first invention, a non-oscillating socket joint 20, is illustrated in FIGS. 1–4. Joint 20 includes a rigid metallic socket member 22 and a bracket style cylindrically shaped rigid metallic stud 24. Stud is received in a housing 26 of socket member 22.

An exploded view of joint 20 is shown in FIG. 2. Stud 24 includes a bracket mounting portion 28 extending longitudinally away from a first end 30 and an annular bearing flange 32 positioned at a second longitudinal end 34. Bracket mounting portion 28 will vary depending upon the application for joint 20. Bearing flange 32 includes an outer diameter 36, a longitudinally inner bearing surface 38 and a longitudinally outer bearing surface 39. Disposed between bearing flange 32 and mounting portion 28 is an annular bearing surface 40. Bearing flange 32 and annular bearing surface 40 are adapted to be received within housing 26. The diameter of bearing surface 40 is typically less than that of both mounting portion 28 and bearing flange 32.

To retain stud 24 within housing 26, joint 20 uses a cylindrical, rim-supported three piece bearing set 41, shown in FIG. 1, comprising a sleeve 42, a cylindrical wedge bearing 43, and a rim wedging bearing 44. In conjunction with rigid housing 26, bearing set 41 makes joint 20 extremely tight with no axial or radial play, but allows necessary stud rotation about a longitudinal axis. Bearing set 41 compensates for wear using a self-adjusting feature, discussed below, related to the release of a compression pre-load within the bearing set.

As illustrated in FIG. 3, sleeve 42 extends longitudinally from a first end 45 to a second end 46 and includes a cavity 47 defined by a radially inner surface 48 of a skirt 49. Sleeve 42 also includes a radially outer surface 50. In one preferred embodiment, inner surface 48 of sleeve 42 is cylindrical while outer surface 50 is slightly tapered or cone shaped, wherein the diameter of outer surface 50 is greatest at end 46 of sleeve 42. In another preferred embodiment, both inner surface 48 and outer surface 50 are tapered radially outwardly from end 45, with skirt 49 having a constant material thickness.

Housing 26 has a longitudinally extending cavity 52. As illustrated in FIG. 3, cavity 52 does not have a single diameter between a one step floor or ceiling 54 at a first longitudinal end 56 and a cylindrical opening 58 at a second longitudinal end 60. Instead, cavity 52 has two distinct portions separated by a transition zone 62. The first portion is a cone shaped nest 64 with a radially inner surface 66 adjacent floor 54. Nest 64 provides a draft angle preferably between 1 and 3 degrees relative to a longitudinal axis, wherein surface 66 extends radially outwardly from end 56. One of the purposes of the draft angle is to aid in the molding process of socket member 22. The second portion is an outer cylindrical bore 70, having a radially inner surface 72 with a generally constant diameter that extends from transition zone 62 to end 60. Typically, the diameter of inner surface 72 corresponds to the greatest diameter of inner surface 66 of nest 64.

Sleeve 42 is received within cavity 52 of housing 26. Preferably, sleeve 42 neither contacts housing floor 54 nor extends the full longitudinal extent of cavity 52. Outer surface 50 has a greater diameter than a corresponding portion of cavity 52. Thus, when sleeve 42 is received in cavity 52, a mild to moderate interference fit between surface 50 of sleeve 42 and surfaces 66 and 72 of housing 26 results in a wedging action to create a generally radial compression pre-load. Such a wedging action permits greater tolerances and more variation in assembly tolerance stack-ups. To aid in the insertion of sleeve 42 into cavity 52, a radially outer lower edge 74 of sleeve end 45 may be chamfered or slightly radiused. The draft angle of inner surface 66 may contribute to the wedging action.

Cylindrical wedge bearing 43 is adapted to be received on bearing surface 40 of stud 24. Bearing 43 includes a radially inner main bearing surface 76 that contacts bearing surface 40, and a radially outer bearing surface 78 adapted to have a diameter slightly greater than a corresponding portion of inner surface 48 of sleeve 42. Thus, a wedging action or radial compression pre-load results between bearing 43 and sleeve 42 that is similar to that between sleeve 42 and housing 26. To aid in the insertion of bearing 43 into sleeve 42, corresponding edges of both the sleeve and bearing may be chamfered or slightly radiused.

Bearing 43 is hinged as shown in FIG. 2 with a longitudinal slot 80 formed on the side opposite a longitudinal hinge 82. Such a hinge is necessary for proper positioning of bearing 43 with respect to stud 24 because of the greater diameters of both bracket portion 28 and bearing flange 32. Under some circumstances it may be desirable to hinge sleeve 42 in a similar manner. Bearing 43 also includes a longitudinally outer bearing surface 84 that is adjacent longitudinally inner bearing surface 38 of bearing flange 32.

At a longitudinal neck or end 88 opposite bearing surface 84, bearing 43 has a sealing lip 90, lip 90 having a diameter that is less than the diameter of outer bearing surface 78, a landing pad or ledge 91 formed between lip 90 and surface 78. As illustrated in FIG. 4, once bearing 43 is received within cavity 52 of housing 26, sealing lip 90 cooperates with an aperture 92 formed in floor 54 and ledge 91 cooperates with a step 93 of floor 54 to seal joint 20. Bracket mounting portion 28 extends longitudinally outward from housing 26. To aid in the insertion of bearing 43 into sleeve 42 and aperture 92 of housing 26, a radially outer edge of end 88, a mating edge of aperture 92, the edge of lip 90, and a mating inner edge of sleeve end 46 may all be chamfered or slightly radiused.

Rim wedging bearing 44 includes an outer radial surface 96 with a diameter greater than inner surface 48 of sleeve 42. Bearing 44 is adapted to be inserted into sleeve 42 to create a wedging action compression pre-load similar to that between sleeve 42 and bearing 43. Once again, corresponding or mating edges of bearing 44 and sleeve 42 may be chamfered.

Bearing 44 includes a centering nib 98 extending longitudinally away from a longitudinally inner bearing surface 100. Centering nib 98 is wedged against annular wall 101 within an opening 102 extending longitudinally away from end 34 of stud 24. Bearing surface 100 of bearing 44 contacts outer bearing surface 39 of bearing flange 32 while inner bearing surface 38 of bearing flange 32 contacts outer bearing surface 84 of bearing 43. Ledge 91 contacts step 93 of floor 54 of housing 26. A compression rim 104 positioned opposite bearing surface 100 is adapted to engage either a sealing washer 106 that acts as a seal. In an optional embodiment, a bellville washer or wave spring 108 is positioned between compression rim 102 and washer 106, as shown in phantom in FIG. 2. A spring or bellville washer may be used to increase rotating torque if required by a particular application.

A cross-sectional view of the assembled joint 20 is illustrated in FIG. 4. The joint is sealed by closing housing 26. Housing 26 is typically a forging or a casting. An annular lip 110 of housing 26 is crimped about sealing washer 106. Lip 110 is sized to ensure adequate resistance against severe loading "push out." Further, when housing 26 is closed, a compressive longitudinal load is applied to sealing washer 106 that is transferred through bearing 44, bearing flange 32, bearing 43, and to floor 54 of housing 26. The longitudinal loading provides additional compression pre-load to bearing set 41.

The radial compression pre-load is carried between the inner surfaces 66 and 72 of housing cavity 52 and outer surface 50 of sleeve 42. Next, a portion of the radial compression pre-load is carried between sleeve inner surface 48 and radial surfaces 78 and 76 of bearing 43 to bearing surface 40 of stud 24. Another portion of the radial compression pre-load is carried between sleeve inner surface 48 and outer radial surface 96 of bearing 44 and between centering nib 98 and mating wall 101 of stud opening 102.

A final portion of the radial compression pre-load may be carried between sleeve inner surface 48 and outer diameter 36 of stud bearing flange 32.

Bearing set 41 works in conjunction with stud 24 and housing 26 to make joint 20 extremely tight, while still allowing rotational motion. Sleeve 42, wedge bearing 43, and rim wedging bearing 44 are preferably semi-rigid, allowing constant self-adjustment (or "take up") for wear, however small, occurring between the various components within housing cavity 52. As wear takes place, some compression pre-loading of bearing set 41 is released while still maintaining zero longitudinal or radial play of stud 24 within cavity 52. Thus, joint 20 can resist high radial and longitudinal load forces over an extended life, using elements that are less sensitive to tolerance variations, and produced at lower cost and with lower weight than known prior art joints.

Non-oscillating joint 20 is applicable to a wide range of applications, including pitman-idler arms of steering linkages for automotive applications. While a high performance plastic bearing set 41 is generally envisioned, possible semi-rigid bearing materials include polyethylene terephthalate, sold under the trade name "ERTALYTE"; aramid aromatic polyamide polymer fiber, sold under the trade name "KEVLAR," and combined with 6,6 polyamide, sold under the trade name "NYLON," and resulting in a product sold under the trade names "HYDLAR" or "KEVLAR-NYLON"; 6,6 polyamide, sold under the trade name "NYLON," and combined with a lubricant such as molybdenum disulfide, and sold under the trade names "NYLATRON" and "MDS NYLON"; polyformaldehyde (polyacetal) polymer in oxymethylene linear structure with attached ester or ether terminal groups and sold under such trade names as "DELRIN" and "CELCON"; linear, amorphous polyester (polycarbonate), sold under such trade names as "LEXAN" and "HYZOD"; polymerized acrylonitrile-butadiene-styrene, sold under the trade name "ABS"; linear polyurethane elastomer in a high density, 75 "Shore D" hardness range, sold under the trade name "POLYURETHANE"; ultrahigh molecular weight polyethylene, sold under the trade name "UHMWPE"; chlorinated-polyvinylchloride, sold under the trade name "CPVC"; ethylene-hexene-1 copolymer, sold under the trade name "MARLEX"; polytetrafluoreoethylene (filled), sold under the trade name "RULON"; polypropylene (polyolefin); and polyformaldehyde polymer filled with polytetrafluoroethylene fibers, sold under the trade name "DELRIN-AF."

Joint 20 may be "lubed-for-life," or regreasable. High-shear pre-greasing is required for either type of joint. If a regreasable joint is used, lubricant feed holes and grooves are required. For example, grooves 111 are illustrated in FIG. 2 along surface 100 of bearing 44, extending radially away from centering nib 98, grooves 112 are shown along surface 76 of bearing 43, and an annular groove 113 extends about annular bearing surface 40. As shown in FIG. 4, a feed hole 114 extends through bearing 44 into stud 24. A transverse passageway 115 extends from feed hole 114 to annular bearing surface 40 where it intersects groove 112. An aperture 116 extends through sealing washer 106 and an aperture 118 extends through wave spring 108 to intersect feed hole 114.

When assembling joint 20, sleeve 42 is first wedged into cavity 52. Bearing 43 is opened and then closed about bearing surface 40 of stud 24. Then stud 24 is wedged into sleeve 42 while allowing bracket mounting portion 28 to pass through opening 58 of housing 26. Next, bearing 44 is wedged into sleeve 42 with centering nib 98 wedged into stud opening 102. Then optional wave spring 108 and sealing washer 106 are inserted into cavity 52, and lip 110 crimped to seal the joint and apply the final compression pre-load to bearing set 41.

An alternative embodiment of the present invention, a mechanism 200 is illustrated in FIGS. 5 and 6. Mechanism 200 includes two non-oscillating joints 202 and 204 at opposite ends of a connecting member 210. Joint 202 includes a cylindrically shaped stud 214, stud 214 received in a housing 217 similar to housing 26 of joint 20, but lacking step 93. Joint 204 includes a cylindrically shaped stud 216, stud 216 received in a housing 217. Portions 218 and 220 of studs 214 and 216, respectively, extending longitudinally from housing 217, are quite different. However, to retain the respective studs within their corresponding housing 217, each joint uses a two piece bearing set 222 comprising a sleeve 224 and a rim wedging bearing 44, bearing 44 the same as that discussed above with respect to joint 20. Bearing set 222 works in conjunction with housing 217 to limit the degree of freedom of studs 214 and 216 to rotational motion about a longitudinal axis.

An exploded view of joint 202 is shown in FIG. 6. Stud 214 includes portion 218 extending longitudinally away from a first end 226 and outward from housing 217, and a conical bearing surface 228 extending away from a second longitudinal end 230, the diameter of surface 228 being the greatest at end 230. End 230 includes a longitudinally outer bearing surface 232 and a radially centered opening 233 that extends longitudinally into stud 214.

Sleeve 224 includes a cavity 234 defined by an inner radial surface 235 of a skirt 236 and extends from a first longitudinal end 237 to a second longitudinal end 238. Sleeve 224 is adapted to be received within cavity 52 of housing 217. Cavity 52 has a ceiling or floor 54 at a first longitudinal end 56 and a cylindrical opening 58 at a second longitudinal end 60. Sleeve 224 may be one-piece or hinged in a manner similar to that of bearing 43, above.

Cavity 52 has two distinct portions separated by a transition zone 62. As discussed above with respect to FIG. 3 and joint 20, the first portion is a cone shaped nest 64 with a radially inner surface 66 is adjacent floor 54. The second portion is an outer cylindrical bore 70, having a radially inner surface 72 that extends from transition zone 62 to end 60.

A generally cylindrical radially outer bearing surface 239 of sleeve 224 has a greater diameter than a corresponding portion of cavity 52. Thus, when sleeve 224 is received in cavity 52, a mild to moderate interference fit results in a cylindrical wedging action between surface 239 and both inner surface 66 and inner surface 72 of housing 217 to create a generally radial compression pre-load. Such a wedging action permits greater tolerances and more variation in assembly tolerance stack-ups, as discussed above. Corresponding or mating edges of the sleeve 224 and housing 217 may be chamfered to aid in the insertion of sleeve 224 into cavity 52. A draft angle of nest inner surface 66 may contribute to the wedging action.

End 237 of sleeve 224 includes a secondary sealing lip 240, lip 240 having a diameter that is less than the diameter of outer bearing surface 239. A landing pad or ledge 242 is formed between lip 240 and outer surface 239. Once sleeve 224 is received within cavity 52 of housing 217, sealing lip 240 works in conjunction with an aperture 92 formed within floor 54 to seal joint 202 while still allowing portion 218 to extend longitudinally outward from housing 217.

Inner surface 235 of sleeve 224 is conical, adapted to closely conform to a mating portion of stud bearing surface

228. The respective diameters of stud surface 228 and sleeve surface 235 are dimensioned to create a wedging action between the sleeve and stud that has both a radial component and a longitudinal component.

At end 238 of sleeve 224, a cylindrical opening 244 adjacent surface 235 with an inner radial surface 246 is formed that extends a short longitudinal distance into sleeve 224. Cavity 244 is adapted to receive cylindrical rim wedging bearing 44. Bearing 44 includes an outer radial surface 96. Surface 96 has a diameter greater than surface 246 of cavity 244 to create a wedging action compression pro-load.

Bearing 44 includes a centering nib 98 extending longitudinally away from a bearing surface 100. Centering nib 98 is wedged using an interference fit against an annular wall 248 within opening 233. A compression rim 104 positioned opposite bearing surface 100 of bearing 44 is adapted to engage a sealing washer 106.

Both bearing 44 and sleeve 224 are semi-rigid. Thus, when joint 202 is sealed by closing housing 217 by means of lips 110, a portion of a longitudinal compressive pre-load is transmitted through ring 106 into bearing 44. The longitudinal pre-load in bearing 44 results after stud 214 is wedged further within sleeve 224, creating both a longitudinal and a radial compressive pre-load in sleeve 224 because of the conical nature of stud surface 228 and sleeve surface 235, the sleeve being compressed because of the rigid nature of housing 217 and stud 214. Additional longitudinal compressive pre-load to sleeve 224 results from the direct contact between sealing washer 106 and end 238, which is transmitted through the sleeve to floor 54. As a result, joint 202 allows for constant self-adjustment for wear. As wear takes place between bearing set 222 and either stud 214 or housing 217, some compression pre-load of sleeve 224 or bearing 44 is released while still maintaining zero longitudinal or radial play of the stud within the housing. Thus, joint 202 can resist high radial and longitudinal load forces over an extended life, using elements that are less sensitive to variations in tolerance, and produced at lower cost with a lower weight than known prior art joints.

Preferred embodiments of the present invention have been described. It is to be understood that variations and modifications may be employed without departing from the scope of the present invention. Accordingly, the following claims should be studied to learn the true scope of the present invention.

What is claimed is:

1. A non-oscillating socket joint comprising:

a housing with an annular inner surface, a floor at one longitudinal end of said housing with an aperture centered in said floor, and an opening at a second longitudinal end of said housing;

a semi-rigid annular sleeve disposed within said housing, said sleeve having at least one cavity defined by a skirt, said sleeve including a radially inner surface, and a radially outer surface adapted to conform to said inner surface of said housing, a diameter of said sleeve being slightly greater than a diameter of said housing to create an interference fit between said sleeve and said housing;

a stud with a first portion received in said housing and a second portion extending through said aperture of said floor of said housing, a radially outer bearing surface of said stud adjacent said radially inner surface of said sleeve, said first portion of said stud having a longitudinally outer bearing surface;

a semi-rigid annular bearing disposed within said sleeve, said bearing having a longitudinally inner bearing surface contacting said longitudinally outer bearing surface of said stud, a radially outer surface of said bearing having a diameter slightly greater than a diameter of said radially inner surface of said sleeve to create an interference fit between said bearing and said sleeve, creating a pre-load between said sleeve and said housing and between said bearing and said sleeve to provide self-adjustment; and a closure to retain said sleeve, said bearing, and said first portion of said stud within said housing, which imparts a longitudinally compressive load on at least said bearing.

2. A joint as recited in claim 1, wherein said closure includes a seal placed in contact with a longitudinally outer surface of said bearing.

3. A joint as recited in claim 2, wherein said seal is held in position by an annular lip of said housing.

4. A joint as recited in claim 3, wherein said seal comprises a sealing washer.

5. A joint as recited in claim 4, wherein said seal comprises one of a wavy spring and a bellville washer disposed between said bearing and said sealing washer.

6. A joint as recited in claim 1, wherein said bearing includes a centering nib and said first portion of said stud includes a longitudinally extending opening, said centering nib received in said opening of said stud.

7. A joint as recited in claim 1, wherein said radially outer surface of said first portion of said stud has a diameter slightly greater than said radially inner surface of said sleeve, creating an interference fit between said sleeve and said first portion of said stud.

8. A joint as recited in claim 1, wherein said radially inner surface of said sleeve and said radially outer surface of said first portion of said stud are generally conical.

9. A joint as recited in claim 8, wherein said sleeve includes a cylindrical opening adjacent said radially inner surface at an outer longitudinal end, said cylindrical opening of said sleeve adapted to receive said bearing.

10. A joint as recited in claim 8, wherein said sleeve includes a lip seal at an inner longitudinal end opposite said outer longitudinal end that is adapted to be received in said aperture of said floor of said housing, said lip seal having a diameter less than said diameter of said radially outer surface of said sleeve.

11. A joint as recited in claim 1, wherein said sleeve contacts said floor of said housing.

12. A non-oscillating socket joint comprising:

a housing with an annular inner surface, a floor at one longitudinal end of said housing with an aperture centered in said floor, and an opening at a second longitudinal end of said housing;

an annular sleeve comprising a semi-rigid material disposed within said housing, said sleeve having at least one cavity defined by a skirt, said sleeve including a radially inner surface, and a radially outer surface adapted to conform to said inner surface of said housing, a diameter of said sleeve being slightly greater than a diameter of said housing to create an interference fit between said sleeve and said housing;

a stud with a first portion received in said housing and a second portion extending through said aperture of said floor of said housing, a radially outer bearing surface of said stud having a diameter slightly greater than a diameter of said radially inner surface of said sleeve to create an interference fit between said stud and said sleeve, said first portion of said stud having a longitudinally outer bearing surface;

an annular bearing comprising a semi-rigid material disposed within said sleeve, said bearing having a longitudinally inner bearing surface contacting said longitudinally outer bearing surface of said stud, a radially outer surface of said bearing having a diameter slightly greater than a diameter of said radially inner surface of said sleeve to create an interference fit between said bearing and said sleeve, creating a pre-load between said sleeve and said housing and between said stud and said sleeve and between said bearing and said sleeve to provide self-adjustment; and a closure to retain said sleeve, said bearing, and said first portion of said stud within said housing, which imparts a longitudinally compressive load on at least said bearing.

13. A joint as recited in claim 12, wherein said bearing includes a centering nib and said first portion of said stud includes a longitudinally extending opening, said centering nib received in said opening of said stud.

14. A joint as recited in claim 12, wherein said radially inner surface of said sleeve and said radially outer surface of said first portion of said stud are generally conical.

15. A joint as recited in claim 14, wherein said sleeve includes a cylindrical opening adjacent said radially inner surface at an outer longitudinal end, said cylindrical opening of said sleeve adapted to receive said bearing.

16. A non-oscillating socket joint comprising:

a housing with an annular inner surface, a floor at one longitudinal end of said housing with an aperture centered in said floor, and an opening at a second longitudinal end of said housing;

an annular sleeve comprising a semi-rigid material disposed within said housing, said sleeve having at least one cavity defined by a skirt, said sleeve including a radially inner surface, and a radially outer surface adapted to conform to said inner surface of said housing, a diameter of said sleeve being slightly greater than a diameter of said housing to create an interference fit between said sleeve and said housing;

a stud with a first portion received in said housing and a second portion extending through said aperture of said floor of said housing, said first portion including a bearing flange at a longitudinal end and a radially outer bearing surface between said flange and said second portion adjacent said radially inner surface of said sleeve, said flange having a longitudinally outer bearing surface;

a first annular bearing comprising a semi-rigid material disposed within said sleeve, said bearing having a longitudinally inner bearing surface contacting said longitudinally outer bearing surface of said flange, a radially outer surface of said bearing having a diameter slightly greater than a diameter of said radially inner surface of said sleeve to create an interference fit between said bearing and said sleeve;

a second annular bearing comprising a semi-rigid material received between said sleeve and said first portion of said stud, said second bearing having a radially outer surface with a diameter greater than a corresponding diameter of said radially inner surface of said sleeve, creating an interference fit between said second bearing and said sleeve, said second bearing having a radially inner surface with a diameter less than a corresponding diameter of said radially outer surface of said first portion of said stud, creating an interference fit between said second bearing and said stud; and a closure to retain said sleeve, said bearing, and said first portion of said stud within said housing, said closure including a sealing washer contacting a longitudinally outer surface of said bearing.

17. A joint as recited in claim 16, wherein said bearing includes a centering nib and said first portion of said stud includes a longitudinally extending opening, said centering nib received in said opening of said stud.

18. A joint as recited in claim 16, wherein said radially outer bearing surface of said stud has a diameter less than a radially outer diameter of said flange and said second portion, said second bearing having a longitudinally extending slot and a hinge opposite said slot to permit proper positioning of said second bearing with respect to said outer bearing surface of said stud.

19. A joint as recited in claim 16, wherein said closure imparts a longitudinally compressive load on at least said second bearing.

20. A non-oscillating socket joint comprising:

a housing with an annular inner surface, a floor at one longitudinal end of said housing with an aperture centered in said floor, and an opening at a second longitudinal end of said housing;

an annular sleeve disposed within said housing, said sleeve having at least one cavity defined by a skirt, said sleeve including a radially inner surface, and a radially outer surface adapted to conform to said inner surface of said housing, a diameter of said sleeve being slightly greater than a diameter of said housing to create an interference fit between said sleeve and said housing;

a stud with a first portion received in said housing and a second portion extending through said aperture of said floor of said housing, a radially outer bearing surface of said stud adjacent said radially inner surface of said sleeve, said first portion of said stud having a longitudinally outer bearing surface;

an annular bearing disposed within said sleeve, said bearing having a longitudinally inner bearing surface contacting said longitudinally outer bearing surface of said stud, a radially outer surface of said bearing having a diameter slightly greater than a diameter of said radially inner surface of said sleeve to create an interference fit between said bearing and said sleeve;

a closure to retain said sleeve, said bearing, and said first portion of said stud within said housing, which imparts a longitudinally compressive load on said sleeve of said bearing;

a second bearing, said second bearing received between said sleeve and said first portion of said stud, said second bearing having a radially outer surface with a diameter greater than a corresponding diameter of said radially inner surface of said sleeve, creating an interference fit between said second bearing and said sleeve, said second bearing having a radially inner surface with a diameter less than a corresponding diameter of said radially outer surface of said first portion of said stud, creating an interference fit between said second bearing and said stud, said second bearing including a lip seal at an inner longitudinal end that is adapted to be received in said aperture of said housing, and wherein said second bearing contacts said floor of said housing.

21. A non-oscillating socket joint comprising:

a housing with an annular inner surface, a floor at one longitudinal end of said housing with an aperture centered in said floor, and an opening at a second longitudinal end of said housing;

a semi-rigid annular sleeve disposed within said housing, said sleeve having at least one cavity defined by a skirt, said sleeve including a radially inner surface, and a radially outer surface adapted to conform to said inner surface of said housing, a diameter of said sleeve being slightly greater than a diameter of said housing to create an interference fit between said sleeve and said housing;

a stud with a first portion received in said housing and a second portion extending through said aperture of said floor of said housing, a radially outer bearing surface of said stud adjacent said radially inner surface of said sleeve, said first portion of said stud having a longitudinally outer bearing surface;

a semi-rigid annular bearing disposed within said sleeve, said bearing having a longitudinally inner bearing surface contacting said longitudinally outer bearing surface of said stud, a radially outer surface of said bearing having a diameter slightly greater than a diameter of said radially inner surface of said sleeve to create an interference fit between said bearing and said sleeve; and a closure to retain said sleeve, said bearing, and said first portion of said stud within said housing, which imparts a longitudinally compressive load on at least said bearing, said closure including a sealing washer placed in contact with a longitudinally outer surface of said bearing and one of a wavy spring and a bellville washer disposed between said bearing and said sealing washer, said sealing washer held in position by an annular lip of said housing.

22. A non-oscillating socket joint comprising:

a housing with an annular inner surface, a floor at one longitudinal end of said housing with an aperture centered in said floor, and an opening at a second longitudinal end of said housing;

a semi-rigid annular sleeve disposed within said housing, said sleeve having at least one cavity defined by a skirt, said sleeve including a radially inner surface, and a radially outer surface adapted to conform to said inner surface of said housing, a diameter of said sleeve being slightly greater than a diameter of said housing to create an interference fit between said sleeve and said housing;

a stud with a first portion received in said housing and a second portion extending through said aperture of said floor of said housing, a radially outer bearing surface of said stud adjacent said radially inner surface of said sleeve, said first portion of said stud having a longitudinally outer bearing surface;

a semi-rigid annular bearing disposed within said sleeve, said bearing having a longitudinally inner bearing surface contacting said longitudinally outer bearing surface of said stud, a radially outer surface of said bearing having a diameter slightly greater than a diameter of said radially inner surface of said sleeve to create an interference fit between said bearing and said sleeve;

a second bearing, said second bearing received between said sleeve and said first portion of said stud, said second bearing having a radially outer surface with a diameter greater than a corresponding diameter of said radially inner surface of said sleeve, creating an interference fit between said second bearing and said sleeve, said second bearing having a radially inner surface with a diameter less than a corresponding diameter of said radially outer surface of said first portion of said stud, creating an interference bit between said second bearing and said stud; and a closure to retain said sleeve, said bearing, and said first portion of said stud within said housing, which imparts a longitudinally compressive load on at least said bearing.

23. A joint as recited in claim 22, wherein said second bearing includes a lip seal at an inner longitudinal end that is adapted to be received in said aperture of said housing, said lip seal having a diameter less than said diameter of said radially outer surface of said second bearing.

* * * * *